July 22, 1952  J. O. THORSHEIM  2,604,112
LIQUID FLOW CONTROL DEVICE
Filed July 10, 1944  3 Sheets-Sheet 1
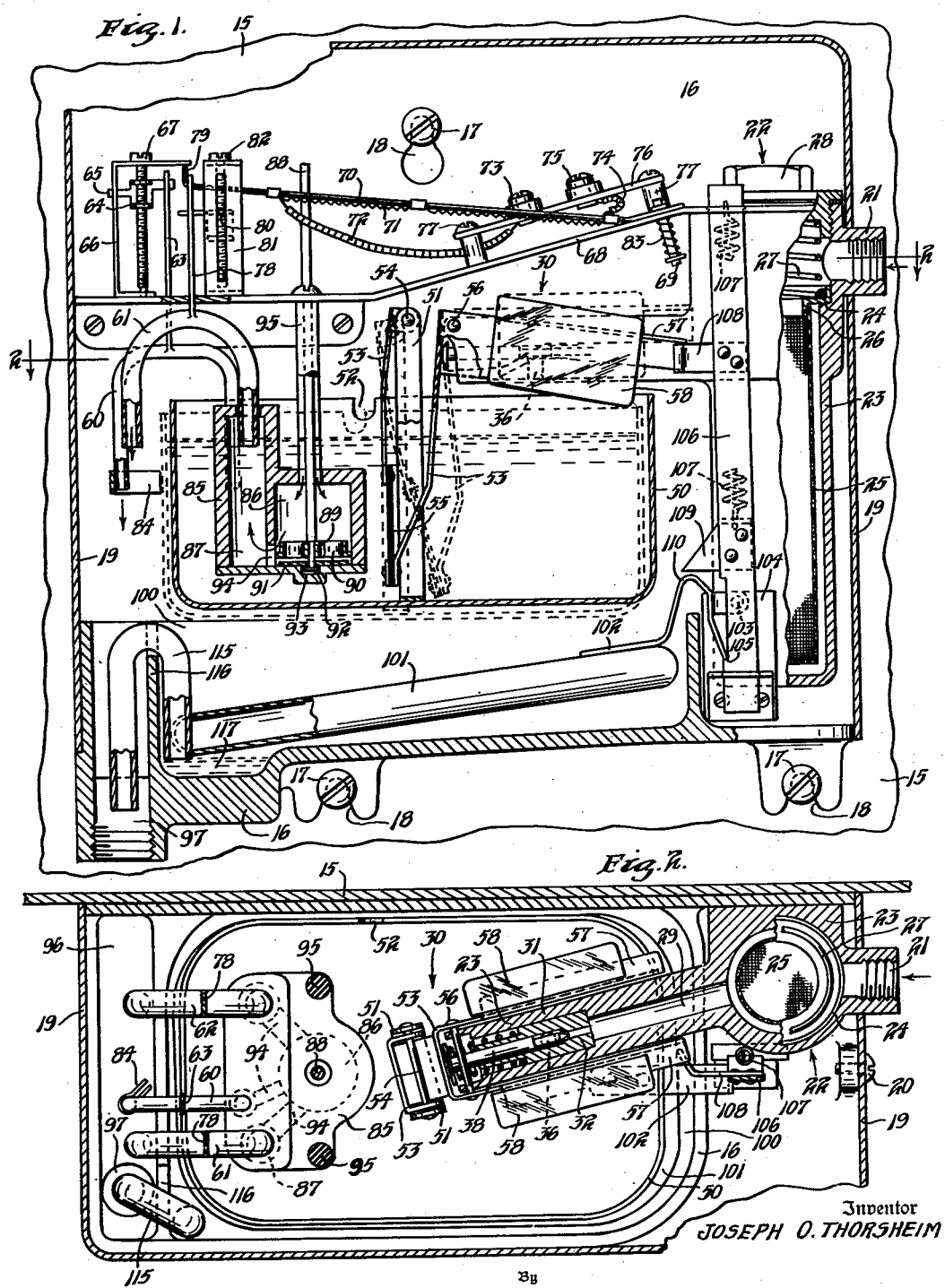
Inventor
JOSEPH O. THORSHEIM
By
George H. Fisher
Attorney

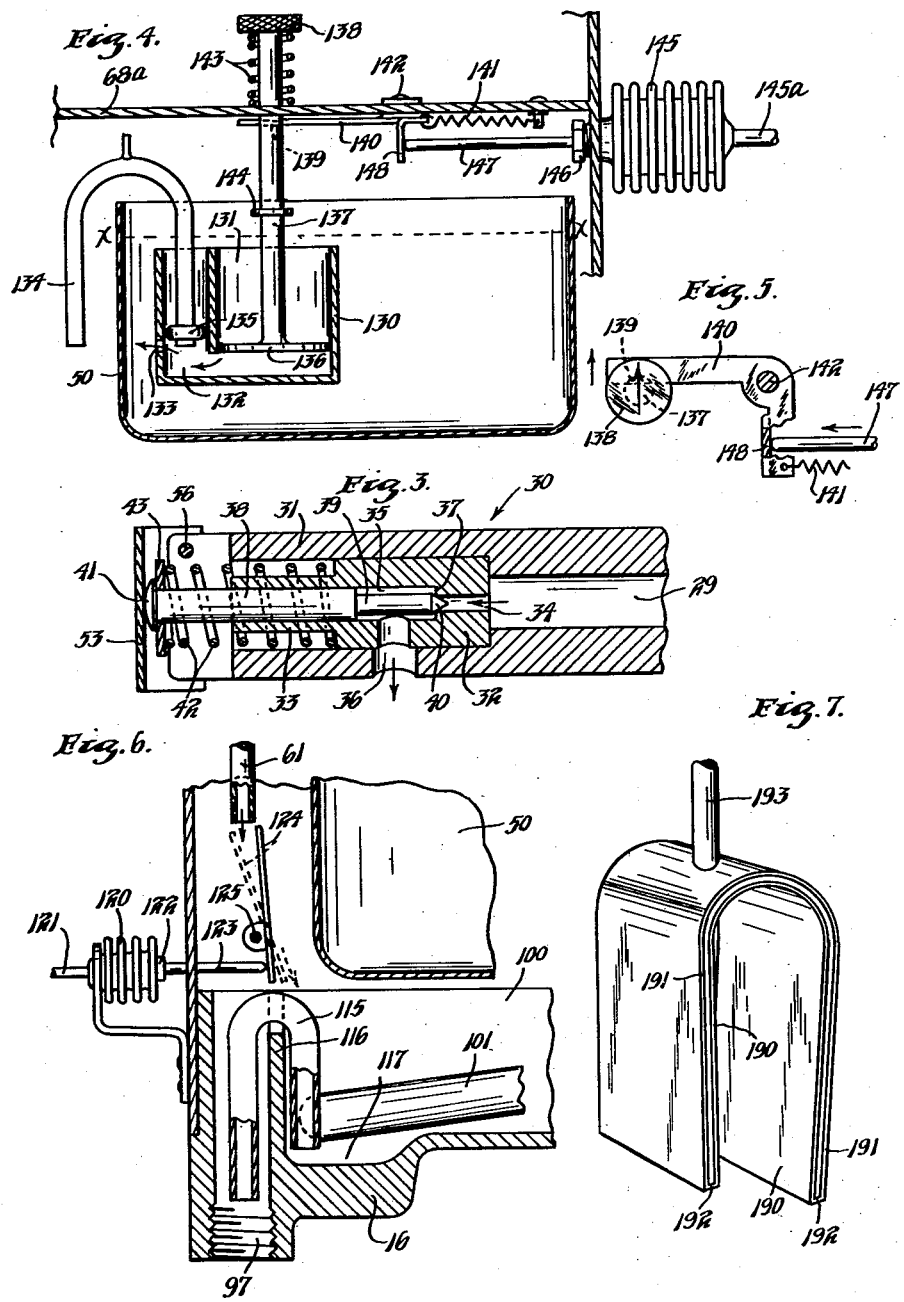

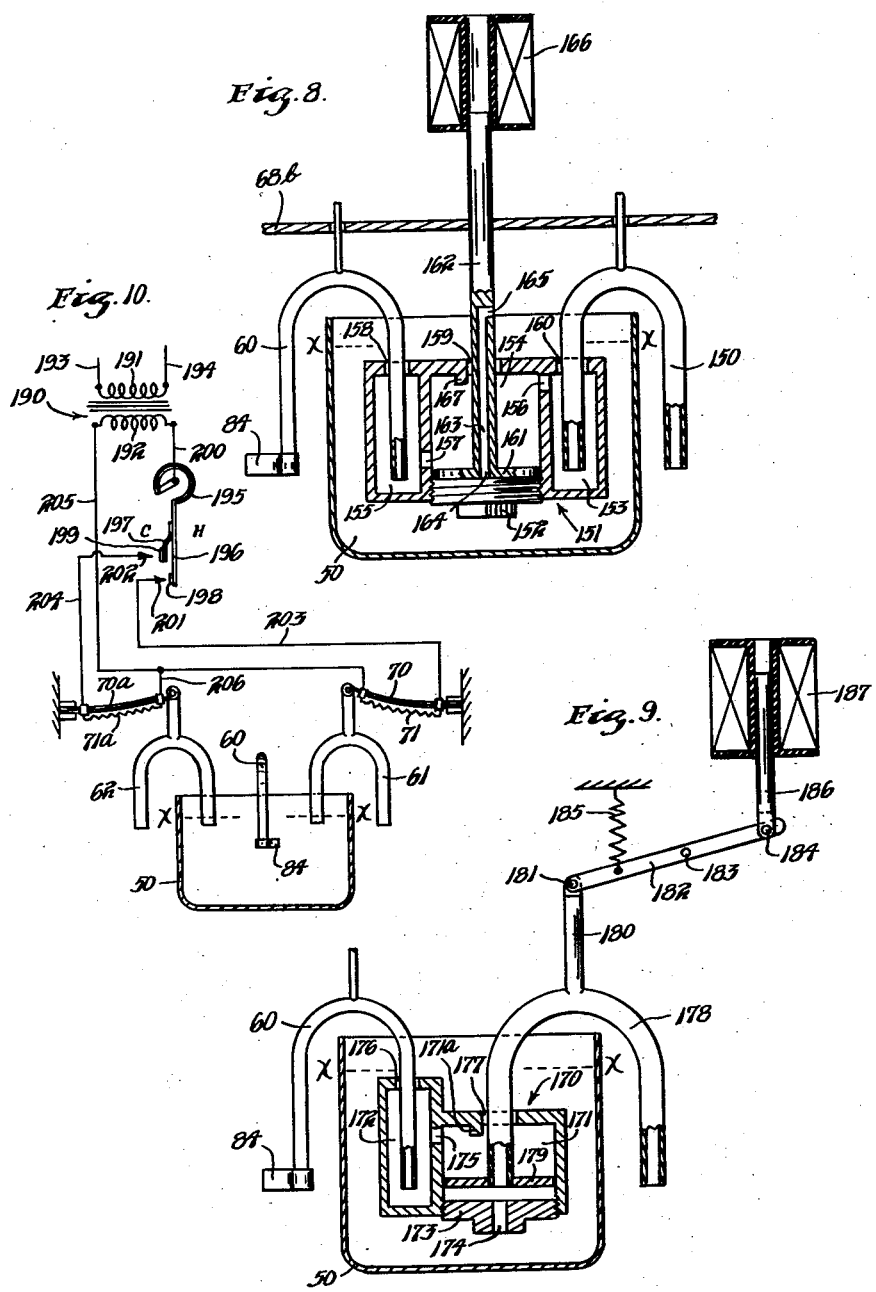

Patented July 22, 1952

2,604,112

UNITED STATES PATENT OFFICE 2,604,112

LIQUID FLOW CONTROL DEVICE

Joseph O. Thorsheim, Minneapolis, Minn., assignor to Minneapolis-Honeywell Regulator Company, Minneapolis, Minn., a corporation of Delaware Application July 10, 1944, Serial No. 544,317

29 Claims. (Cl. 137—126)

My invention is broadly related to an improved device for controlling the flow of liquid. While devices of this nature may have utility in many fields where the accurate control of the flow of liquid is essential, it has particular utility in conjunction with gravity fed type liquid fuel burning furnaces.

In liquid fuel burning furnaces of this type, the fuel is constantly fed through a conduit to the burner, but the rate of flow is dependent upon the demand of the space whose temperature is being controlled. When the demand for heat has been satisfied the flow of fuel must be reduced to the most economical quantity which will still be sufficient to support a pilot flame, and as the heating value of this form of combustion is of little relative value, it is of principal importance that the quantity be as small as practicable. In a majority of the control devices of the prior art, the flow of liquid is controlled by a metering valve. This arrangement has an inherent fault in that sediment and residual matter carried by the fuel has a tendency to clog the valve structure and thus interfere with the constant flow of liquid. In more recent times, several arrangements have appeared which utilize mechanically moving parts which obviate the older difficulty, but with the latter devices the quantity of fuel fed for the purpose of supporting pilot combustion is still excessive.

One object of my invention is to provide one or more unrestricted conduits which will properly regulate the flow of liquid and which are free of the objections found in devices of the prior art. Although these conduits may take one or more forms, I prefer an arrangement which provides flow by a siphon-like device, wherein the rate of flow may be controlled by vertically moving the device with relation to the level of liquid in a chamber arranged to maintain a substantially constant liquid level.

Another object is to provide a device in which the uninterrupted flow of fuel to support pilot combustion may be reduced to as little as one-half pint of liquid fuel in twenty-four hours.

A further object is to provide a device for the control of the flow of liquid fuel in a plurality of quantities, as for example, to support combustion for low, intermediate, or high fire demand.

Another object is to provide in a liquid fuel feeding device, means for shutting off the flow of fuel in the event of flame failure.

Another object is to provide in a liquid fuel feeding device, means for shutting off the flow of fuel in the event the furnace exceeds a predetermined high temperature.

Another object is to provide in a liquid fuel feeding device of this type which uses an unrestricted conduit, means for initiating flow of liquid through the conduit and further means for terminating the flow of liquid through the conduit.

A further object is to provide in a liquid fuel feeding device of this type, which according to safety regulations must have an overflow chamber, means for emptying said overflow chamber into the normal outlet conduit leading to the burner.

Numerous other and further advantages will be made evident in the succeeding description and claims, and in the appended drawings in which:

Figure 1 is a view in side elevation of the control device with certain portions being broken away and others shown in cross section;

Figure 2 is a top elevation of the device taken on the line 2—2 of Figure 1;

Figure 3 is a cross sectional view in side elevation of the liquid inlet valve;

Figure 4 is a cross-sectional view in side elevation of a modification of means for initiating flow of liquid and means for terminating the same;

Figure 5 is a top elevation of certain parts shown in Figure 4;

Figure 6 is a broken away side elevation of another means for terminating liquid flow to the burner;

Figure 7 is a perspective of a modification of liquid flow control means wherein flow is dependent upon the surface tension of the liquid;

Figure 8 is a cross-section of a modification of automatic means for initiating and terminating flow of liquid through the siphonic conduit;

Figure 9 is a cross-section of another modification of means for initiating and terminating the flow of liquid through the siphonic conduit; and, Figure 10 is a schematic view of a wiring diagram in which a plurality of conduits are placed under the operable control of a space thermostat.

The device will now be explained in detail and by referring to Figures 1 and 2, the reference numeral 15 indicates a side of a furnace to which the device has been attached to provide liquid fuel for a burner (not shown) within said furnace. The device consists of a casting 16 secured to the furnace wall 15 by screws or bolts 17 which adjustably fit in the slotted apertures 18 in such a manner that the device may be readily removed. A cover plate or casing 19 completely encloses the entire device so that none of the operating portions extend exterior of the casing in such a manner that they might be tampered with by an unauthorized person. The cover 19 is secured to the device by bolt 20.

Following the normal course of the fluid fuel through this control device, reference numeral 21 indicates an interiorly threaded boss which serves as a fluid inlet and is normally connected to a tank or other liquid source which is so situated that the liquid enters the device by gravity. After entering the device, the liquid flows through a filter or strainer element indicated by the general reference numeral 22, for the purpose of filtering out any objectional solid substances that may be present in the liquid. The filter assembly consists of a cylindrical casing 23, having an internal annular shoulder 24 which serves to support the filter element 25, which may be made of fine wire mesh. The filter element 25 is secured to an annular ring 26 which is positioned in the annular shoulder or recess 24. A helically wound expansion spring 27 is secured by soldering or the like within the inner recess of member 26 and is held in compression by the cap 28 which is threaded into an upper potion of the body member 23. An outlet passage 29 communicates with the area around the exterior of the mesh 25 for conducting liquid to the inlet valve structure to be explained hereinafter. It will be observed that mounting the strainer in this manner has a distinct advantage, for when it is desired to remove the mesh element 25 for cleaning, it is only necessary to unscrew the cap 28 whence the entire strainer may be removed as a unit, consisting of the spring 27, the annular ring 26, and mesh 25. The strainer may be removed from the top of the device without the necessity of draining liquid from any portion of the device and without causing a spilling of the liquid.

The inlet valve structure indicated by the reference numeral 30 is shown generally in Figures 1 and 2 and in detail in Figure 3. It consists of a body member 31 formed integral with the filter casing 23 and contains the internal passage 29 which constitutes the outlet from the strainer. A closely fitting insert 32 situated within the member 31 provides a small passageway 34 which connects passage 29 with a wider passageway 35 and an outlet 36. At the junction of the passageways 34, 35, the restriction provides an annular valve seat 37. A needle valve 38 is slidably mounted within the passage 35 and has a portion of reduced diameter 39 with a tapered portion 40, for engagement with the valve seat 37, to cut off the flow of liquid to the outlet 36. At the opposite end, valve 38 has an enlarged head 41, intended for engagement with an operating member. A spring 42 slidably fits over a reduced portion 33 of the insert 32 and engages a washer 43 positioned under the head 41 of the needle valve 38. The action of the spring 42 is to hold the needle valve 38 in a normally open position to permit the flow of liquid from the passage 29 to the outlet 36. The valve 38 is moved to a closed position by engagement with means 53 to be explained hereinafter.

A chamber 50 having an open top is provided for receiving the liquid passing through the valve outlet 36 and is provided with a pair of posts 51 which are suitably fastened within the bottom of the chamber 50. The chamber 50 is intended to maintain a substantially constant level of liquid therein, but has a U-shaped opening 52 on its upper edge to provide a channel for overflow of liquid should the inlet valve structure explained above, fail to function properly. Means 53 comprises a hairpin shaped lever member pivotally connected at one end to posts 51 by a pin 54 which extends between the posts 51. The lever 53 extends downwardly within the chamber and has suitably connected to it a bimetallic element 55 which forms a portion of the lever and functions to alter the liquid level in the chamber in response to a change of the liquid temperature. The other upper extension of lever 53 is secured by a pivot pin 56 to valve structure 30 and is connected to a pair of arms 57 which extend laterally on either side of the valve structure 30. Suitably fastened to the arms 57 are a pair of weights 58 which are of sufficient mass to counterbalance the chamber 50 on the pivot 56 when the liquid in chamber 50 has reached a predetermined constant level.

When the chamber 50 is empty, it will be held in the position shown in the full line of Figure 1 by the weights 58 and liquid will pass through the valve structure 30 into said chamber. As the liquid reaches the substantially predetermined upper level, the combined weight of the liquid and the chamber 50 will approach an equilibrium with the weight of the counterpoise members 58, at which time the lever 53 will rotate on the pins 54 and 56, to engage the head 41 of valve 38 to move it to a closed position. Thereafter the parts will assume the position shown in the dotted lines shown in Figure 1. The bimetallic element 55 will under normal conditions be in its straight line position shown in Figure 1, but its function is to compensate for variations in the viscosity of the liquid brought about by temperature variations and to compensate for temperature changes thereof. In the event that the temperature of the liquid entering chamber 50 is unusually cool, the bimetal 55 will warp to the right as seen in Figure 1, to cause pin 54 to move in the direction of pin 56, thus tending to shorten the operative length of lever 53 thereby shifting the center of gravity formed by the lever 53 and pin 54 and will thus cause a somewhat greater amount of oil to enter the chamber 50 before lever 53 moves to close the valve 38. On the other hand, should the temperature of the liquid be above that which would be regarded as a normal temperature, the bimetal 55 will warp to the left to cause a closing of valve 38 at a lower liquid level in chamber 50 than is otherwise normal. Thus, for reasons to be explained hereinafter, it will be seen that I compensate for a difference in viscosity of the oil caused by temperature change, by raising or lowering the substantially constant level of the liquid in the chamber 50.

To provide a means of metering the liquid out of the constant level chamber, I provide a pilot siphon 60 and one or more larger siphons 61 and 62, although an alternative conduit structure which I have found was highly efficient, is shown in Figure 7. Referring now to Figure 1, the pilot siphon 60 is formed of a piece of seamless tube in such a manner that there will be no restriction at either of its open ends or at any of its curved portions. Suitably fastened to the upper portion of the siphon 60 is a rod 63, which in turn is fastened to a bracket 64 having an extension 65 which cooperates with a bracket 66 having suitable indices, to indicate the position of the pilot siphon with relation to the head of the liquid in the constant level chamber. A threaded screw 67 extending through an aperture in bracket 66 is provided for manually moving bracket 64 in a vertical manner to thereby manually adjust the position of pilot siphon 60 with relation to the liquid in the constant level chamber 50.

A plate member 68 is mounted over the chamber 50 to provide support for bracket 66 and a plurality of other devices and parts which cooperate to provide for the proper operation of the control device. A bimetallic element 70 which is intended to operate either of siphons 61 or 62 is suitably fastened to the plate 68 by a stud 69. Suitably wound in heat exchange relation with one portion of the bimetal element 70 is an electrical heating element 71 which is connected at one end by the wire 72 to a terminal 73 and at the other end by a wire 74 to a terminal 75. The terminals 73 and 75 are insulatingly mounted on a member 76 which is secured to the plate 68 by screws 77. These terminals are provided for receiving an electrical current from a temperature control device such as a room thermostat, which would be suitably mounted in the space whose temperature is to be controlled.

As in the manner of the pilot siphon 60, the main siphon 61 has a rod 78 attached to an upper portion of the siphon. Rod 78 is fastened to an upturned end 79 of the bimetallic element 70. The bimetallic element 70 is normally in a raised position with the end portion 79 abutting the bracket 66 but when heated by an electric current passing through the resistance 71, is arranged to warp downwardly, moving siphon 61 in a downward direction with relation to the liquid level in the container 50. A bracket in the form of a stop member 80 is made adjustable with relation to a bracket 81 by a screw 82 so as to limit the movement of the rod 78 in its downward movement and therefore limit the movement of the siphon 61 with relation to the head of the liquid in chamber 50 to thereby control the rate of liquid flow through the siphon 61. As long as the winding 71 is energized or heated, the siphon will remain in its downward position, but when the source of the heat has abated, it will return to its normally elevated position. A strain release spring 83 is helically wound on the stud 69 to provide a resilient means of absorbing the additional contortion caused by continued heating of the bimetal 70 after it has reached the limit of its downward movement as defined by the position of the adjustable stop 80. A similar arrangement may be provided for the operation of siphon 62 in the event that the control of a greater amount of liquid than could be provided by siphon 61 is desired.

Since the purpose of the pilot siphon 60 is to provide only a minimum flow of liquid passing from the constant level chamber, its internal dimensions will be considerably smaller than either of the other siphons 61 and 62, and by adjusting the height of the pilot siphon 60 with relation to the liquid level in the constant level chamber 50, the minimum flow may be regulated. When the pilot siphon 60 is initially adjusted with relation to the liquid level in chamber 50 so that only a relatively small amount of liquid could pass through the siphon, the surface tension of the liquid across the end of the tube tends to form a membrane which prevents the formation of a drop and thus prevents the starting of the pilot flow. To overcome this effect, a clip member 84 is fastened on the end of the conduit with its lateral portions extending below the end of the tube. This arrangement causes the meniscal envelope to wet the interior sides of member 84 and flow to the bottom thereof, so that a large drop is thus formed which will more readily separate from the member 84. This clip 84 therefore permits a much more economical pilot flow than would be otherwise possible.

The amount of liquid which will flow through the siphons depends on several factors including the viscosity of the liquid. When the liquid is cold, its rate of flow will be retarded, and when the liquid is hot, its rate of flow is accelerated. The purpose of bimetal portion 55 of lever 53 is to so vary the level of liquid in chamber 50 upon changes in the temperature of the liquid therein as to maintain the flow through the siphons substantially constant, irrespective of changes in viscosity.

In order to make the siphons operative when the apparatus is initially installed, it is necessary that they be properly primed, and under ordinary conditions when once primed the siphons retain liquid within each of the legs even when the siphon is in a raised position since both legs are of equal length.

While the siphons described heretofore have been constructed with legs which are of substantially equal length, wherein flow control is obtained by moving the siphon with relation to the liquid level, the criterion of flow control with such an arrangement is the difference which exists between the liquid level in the chamber and the position of the terminal end of the external leg of the siphon. As long as the internal leg remains below the liquid level, increased flow may be obtained by lengthening the external leg as by telescoping or other similar means which will accomplish this purpose. And assuming the end of the internal leg constantly remains below the liquid level, flow may be restricted by shortening or raising the external leg to a point just short of being above the liquid level in the chamber. Therefore, it is within the spirit of the present invention that flow control means such as 60, 61 and means shown in Figure 7, may be constructed with a flexible or expansible external terminal portion. When in a normal inoperative position one of the legs of the siphon is preferably positioned just below the surface of the liquid in chamber 50 and will therefore serve to continuously replace any liquid which is lost either by evaporation or other means from the opposite end of the leg. There is not, however, sufficient "head" under such conditions to cause any flow through the siphon.

Further, I have found that with the legs of the siphons made equal in length, the siphons can be entirely removed from the liquid without losing their prime. This is undoubtedly due to the fact that with legs of equal length and sufficiently small diameter the tendency of the oil to flow out of the legs is overcome by the action of barometric pressure on the ends of the legs taken together with the surface tension of the liquid. For example, the siphon 60 may have an internal diameter of one-eighth of an inch or even larger when using number one fuel oil without losing its prime. Perhaps even a larger internal diameter could be used, but this, of course, will vary with type of liquid used.

I prefer to make the siphons 61 and 62 of tubing having an inside diameter of approximately one-eighth of an inch. The larger the diameter, the greater the flow. The flow can also be increased by moving the siphon further into the liquid. It follows that with a smaller diameter siphon larger vertical adjustments are necessary to give a predetermined change in flow; this in turn means that the vertical adjustment is not so critical with a small tube as it is with a large tube. For this same reason I prefer to make the pilot or minimum flow siphon 60 with an internal diameter of about one-sixteenth of an inch.

To prime the siphons, as for example, just prior to the heating season or when for any reason the liquid was removed therefrom, I have provided a casing 85, the greater portion of which is positioned below the normal liquid level. The casing 85 is mounted on plate 68 by the rods 95 and is divided into two sections having a plunger and receiving section 86 and a siphon feeding section 87, with the direction of liquid flow indicated in Figure 1 by small arrows. The plunger is manually operable and consists of a rod 88 fastened to a disk 89 which has in it a plurality of apertures 90. Below the member 89 is positioned a washer 91 which is of somewhat narrower dimension than member 89 and is held by an enlarged head portion 92 of the rod 88, which in its downward position fits in a small recess 93 at the bottom of chamber 86. When it is desired to prime the siphons, they are manually depressed for a considerable depth within the liquid in chamber 87, and the rod 88 is manually lifted and quickly depressed. The liquid in chamber 86 is engaged by the washer 91 and is forced through the apertures 94 with a velocity which will be sufficient under normal conditions to prime the siphons. An arrangement is provided to prevent the accidental sucking back of the liquid through the siphons by an upward movement of the plunger. The washer 91 is slidably mounted on the rod 88 so that when the rod 88 is lifted washer 91 falls away from the disk 89 until it is engaged by the enlarged head section 93 leaving the apertures 90 unobstructed for the free passage of liquid therethrough. However, when rod 88 is moved downwardly the washer 91 is moved against the disk 89 to close the apertures 90 to provide the required piston action. The recess 93 is provided so that the head portion 92 of rod 88 will not hinder the full movement of the plunger in the downward stroke.

Under the conditions set forth above, the liquid will normally travel from the chamber 50 through the device 85 and thence through the siphons 60 and 61 to a trough 96 and through the outlet 97 to a conduit leading to the burner (not shown). However, since there is the possibility of a number of unsafe conditions which might arise either through the faulty operation of the device or through faulty operation of the furnace, a number of safety precautions have been incorporated which will render the device inoperative and thereby terminate the flow of liquid through the device. If, for example, the inlet valve control should become faulty and fail to close properly, the incoming liquid would overflow chamber 50 passing through the aperture 52 into a safety chamber 100 below. A safety float 101 is positioned in the chamber 100 and is so arranged with a combination of elements to provide additional valve closing means for the inlet valve assembly 30. Suitably fastened to the top of float 101 is a lever 102 which is fulcrumed on pin 103 of bracket 104 with the free end of the lever 102 engaging a cut-out portion 105 of a lever 106. The lever 106 is thus held in a downward position against the bias of an expansion spring 107 which is fastened at one end to the plate 68 and is fastened at the other end to an abutment 109 which is also fastened on lever 106. In the event that liquid enters the overflow chamber 100, the float 101 is raised by its buoyancy until the free end of lever 102 moves out of engagement with the cut-out portion 105, whereupon the spring 107 causes lever 106 to move upwardly with a snap action. A second abutment 108 which is suitably fastened to lever 106 engages one of the extending arms 57 which form an extension of lever 53, in such a manner as to cause vigorous engagement of the lever 53 with the head 41 of valve 38 to thereby close the valve with a snap action. The spring 107 has sufficient strength to hold the weights 58 in a raised position, and since this will cause a rotation of the lever 53 on the pivots 54 and 56, the inlet valve 38 will be held in a closed position by the combination of the strength of spring 107 and the weight of the liquid in chamber 50 which is ample to positively prevent further ingress of liquid.

When the safety trip mechanism has been automatically actuated, the device becomes inoperative and must be manually reset. To accomplish this, cover 19 must be removed and an extension of rod 106 which protrudes through plate 68 is manually depressed. Depressing the lever 106 causes abutment 108 to move away from the weighted extension 57 of the lever 53 to thereby free the valve mechanism and restore it to normal control by the counterbalanced chamber 50 and lever 53. Continued downward movement of lever 106 causes the abutment 109 to engage the rounded portion 110 of lever 102 to cause a depressing of the float 101 in chamber 100 back to its lower inoperative position and engagement of the free end of lever 102 in cut-out portion 105 of lever 106. Lever 106 is thus again held in its lower inoperative position against the bias of spring 107.

It will be observed that a siphon 115 is mounted in the cut-out portion 116 of casting 16 which forms the chamber 100. The siphon 115 has legs of unequal length. The longer leg is positioned in the outlet 97 while the shorter leg is positioned within a depression 117 of chamber 100 so that as the float member 101 is depressed, causing a displacement of the liquid in chamber 100, the siphon 115 will be primed by the upward surge of liquid through its inner periphery and thereafter chamber 100 will be substantially emptied by the action of siphon 115, thus permitting the liquid to pass out through the normal outlet 97.

The safety chamber 100 and its coacting parts is adapted to serve as a safety device in a second manner in that the complete structure is mounted on the furnace 15 in such a manner that the height of the top of the vaporizing burner (not shown) is slightly above the top of the wall 116. In the event of flame failure and accumulation of liquid unburned fuel in the burner and in the conduit extending from the control device, such unconsumed liquid fuel will back up into the conduit and trough 96 until it overflows the cut-out wall portion 116 or passes through siphon 115 into the safety chamber 100 thereby causing float 101 to rise, bringing into operation the action of the safety trip mechanism set forth hereinbefore. With this arrangement, it will be evident that if for any reason the burner fails to function in a proper manner the mechanism is operable to shut off further flow of liquid fuel in time to prevent an overflow of the burner within the furnace. When the cause of burner failure has been corrected, the device may again be made operative in the manner described above, and, except for draining the burner, will not cause any spillage of the liquid fuel in the area surrounding the furnace.

Referring now to Figure 6, there is shown another safety precaution arrangement which is operable in conjunction with safety chamber 100. In this arrangement a limit control, operable upon the furnace exceeding a predetermined high temperature, acts to divert the stream of liquid fuel passing from either siphon from the trough 96 to the safety chamber 100 to cause a raising of float 101 and a shutting down of the device in the manner previously described. A bellows 120 is connected with a conduit 121 which in turn is connected to a bulb mounted in the top of the furnace (not shown). The system would contain an expansible fluid or volatile fill being of such character and quantity that when a predetermined high temperature has been exceeded by the furnace the closed end of the bellows 122 would extend to the right as shown in Figure 6, and cause rod 123 which forms an extension of bellows 122 to engage the lower portion of a rotatable balanced plate 124, which is pivotally mounted as at 125 on an extension of wall 116 in such a manner that the upper portion of plate 124 passes outwardly under the siphons and diverts the flow of liquid fuel into chamber 100, thereby causing the device to become inoperative in the manner previously described.

It should be understood that the safety features described above do not constitute an admission that the device described hereinabove has inherent weaknesses, but instead they have been provided to make the device and the furnace with which it is connected, safe for purposes of home heating under every conceivable combination of circumstances which might cause failure, or an unsafe condition.

Referring now to Figures 4, 5, 8, and 9, there is shown another combination of means for controlling the flow of liquid through the siphonic conduit. In the foregoing description the flow of liquid through the siphon was regulated by moving the siphon vertically with relation to the head of the liquid in chamber 50, while in Figures 4 and 5, is shown an arrangement whereby the siphon is mounted in a stationary position, with manual means for initiating flow of liquid to the siphon and thermostatic means provided for terminating the flow of liquid in the event that an unsafe condition should arise. In this arrangement, chamber 50 has mounted within it a smaller casing 130 which is of somewhat different structure than casing 85 shown in Figure 1, but which is divided into a large chamber 131 and a smaller chamber 132, having a small opening 133. Positioned within the chamber is one leg of a siphon 134 having a collar 135 in engagement with the vertical walls of chamber 132. A primer, consisting of a piston 136, is mounted on the lower end of a shaft 137 which has a knurled knob 138 for manual operation. To initiate flow of liquid through siphon 134, knob 138 is depressed until a cut-out portion 139 in shaft 137 engages a lever 140, at which point the piston 136 will be in the position shown in Figure 4 and the liquid displaced in chamber 131 will have been caused to flow in the direction shown by the arrows through siphon 134 and outwardly through the opening 133 because of the restriction in chamber 132 caused by the collar 135. This will initiate flow of liquid through the siphon and thereafter additional liquid will enter the chamber 132 through the opening 133. Rod 137 is held in its lower position by engagement of lever 140 with cut-out portion 139 by the resilient strength of spring 141 acting on lever 140 through pivot 142 (see Fig. 5). In the event that it is desired to manually discontinue flow of liquid through the siphon 134, rod 137 may be rotated so that the arrow seen in Figure 5 will point downwardly, thereby causing cut-out portion 139 to disengage from lever 140 and by the action of spring 143, rod 137 will be violently moved upward until stop 144 engages the lower surface of plate 68a. The rapid upward movement of piston 136 will create a suction in chamber 132 which will cause the liquid to be sucked in a backward direction through the siphon 134 and inwardly through the opening 133 in such a manner as to discontinue the flow of liquid through siphon 134. Where this arrangement is used to initiate the flow of liquid fuel to a burner of a furnace, in order to provide for a safe upper limit control, a bellows arrangement 145 is connected on its outer end with conduit 145a to a fluid bulb in contact with another part of the furnace. This thermostatic control contains a sufficient quantity and quality of expansible fluid or volatile fill so that when a safe upper limit of temperature has been reached the increased volume of fluid or the increased vapor pressure of the volatile fill within the bellows 145 causes expansion thereof. Suitably fastened to the closed end of bellows 145, as by means 146, is a rod 147 which, as the bellows expands, will engage a depending portion 148 of lever 140, thereby causing the lever to move away from the cut-out portion 139 of shaft 137 to thereby permit spring 143 to violently move shaft 137 upwardly until the stop member 144 engages plate 68a as previously described, to thereby automatically terminate the flow of liquid through siphon 134.

Figures 8 and 9 show two other arrangements of electrically responsive means for automatically controlling the flow of liquid through the siphon in response to an electrical impulse. In order to better illustrate these modifications, the two siphons are in each case shown as discharging over opposite sides of the constant level chamber. In the modification shown in Figure 8, pilot siphon 60 has a winged arrangement or clip 84 and is mounted in a fixed relation with respect to plate 68b. A siphon 150 is also shown as being mounted in fixed relation to plate 68b and would be of the same general structure as siphons 61 and 62. Within the constant level chamber which is adapted to maintain a constant level of liquid along the line X—X is shown another type of priming casing 151 which may be made by moulding, and closed off with a plug 152, thus forming three chambers 153, 154 and 155, with communicating apertures 156 and 157, between the center and side chambers. As the casing 151 is situated below the liquid level, liquid will be free to enter through apertures 158, 159, and 160. A priming plunger is provided with a piston 161 attached to the lower end of shaft 162 and having therein a hollow bore 163 communicating with an aperture 164 in piston 161 at one end and the atmosphere through an aperture 165. An electromagnetic solenoid 166 or other electrical responsive means is provided for actuating the plunger in response to an electrical impulse received from a condition controlling device such as a space thermostat. In the arrangement shown, either one or the other of the siphons will be in operation and will be conducting fluid out of the chamber 50. Assume the pilot siphon 60 to be in operation. Upon an electrical impulse received by the solenoid 166, the core will be drawn upward within the coil of the solenoid thus moving rod 162 upwardly with a rapid action. As the piston 161 moves upwardly past the aperture 157, it will create a suction in chamber 155 thereby terminating the flow of liquid through siphon 60 and possibly sucking a certain amount of air in through the siphon from the atmosphere. As the piston moves further in its upward direction, it will tend to compress the liquid within chamber 154 and force it to pass outwardly through aperture 156 into chamber 153 until finally the piston comes into contact with stop member 167 which is positioned within chamber 154 and serves to prevent piston 161 from closing off the area between aperture 159 and aperture 156. The upward movement of the piston will cause increased pressure of liquid in chamber 153 thereby initiating flow of liquid through siphon 150, and the liquid may thereafter continue to flow in through apertures 159, 156, chamber 153, and outward through siphon 150. During this period, any air which was entrapped under piston 161 by virtue of the suction created on siphon 60 will be free to escape through aperture 164, the internal bore 163 and aperture 165, thus preventing the formation of an air pocket under the piston. When the need for a flow of a larger quantity of liquid has been satisfied, the solenoid 166 is deenergized and either by the weight of the piston or with the assistance of spring biasing means (not shown) the piston 161 returns to its lower position. As it moves away from the stop member 167, the piston 161 creates a suction which draws liquid from chamber 153 through the aperture 156 into chamber 154 thereby terminating flow of liquid through siphon 150, and as the piston descends it compresses the liquid in chamber 154 forcing it through the aperture 157 into chamber 155 with sufficient force to cause a repriming of siphon 60 to reinitiate pilot flow.

In Figure 9 is shown another modification of means for automatically regulating the flow of liquid through the siphon. In this arrangement a priming casing 170 has a large chamber 171 and a smaller chamber 172, having a plug 173 fitting in the lower portion of chamber 171 which is provided with an inlet aperture 174. Another aperture 175 provides communication between the upper portion of chamber 171 and chamber 172. Apertures 176 and 177 in the upper surfaces of the two cylinders permit the flow of liquid into the separate chambers since the device 170 is positioned below a substantially constant liquid level line X—X in the constant level chamber 50. The main siphon 178 is provided with a cylindrical piston 179 which is in close engagement with the cylinder wall of chamber 171. A rod 180 is affixed to the central upper portion of siphon 178 and by a pivot pin 181, is connected to lever 182, which is rotatable upon a fulcrum 183, having a second pivotal connection 184, with a rod 186, which forms the extension of a core of a solenoid 187. The siphon 178 is maintained in a normally raised position when the solenoid is not energized, by spring 185. Upon a call for liquid flow as by the actuation of a space thermostat, the solenoid 187 is energized and draws the core 186 upwardly, thus causing rotation of lever 182 on pivot 183. As the siphon is moved downwardly with a violent action, liquid in the chamber 171 will in part escape through the aperture 174 but since the piston 179 moves very rapidly, the liquid below the piston tends to become compressed and moves upwardly through the siphon 178 to initiate liquid flow. The liquid entering aperture 174 will thereafter continue to flow through the siphon 178. However, the rapid downward movement of piston 179 causes a condition of reduced pressure to exist in the upper portion of chamber 171 thereby drawing liquid from chamber 172 and also some liquid through the aperture 177. The withdrawal of liquid from chamber 172 causes a suction upon the pilot siphon 60, thereby sucking back the liquid from said siphon and terminating the flow through the pilot siphon. When the demand for liquid flow through siphon 178 has been satisfied, the solenoid 187 becomes deenergized and spring 185 causes lever 182 to rotate in a clockwise direction, thereby violently moving the piston upwardly until it engages a stop 171a which prevents obstruction of aperturese 175 and 177 by the piston 179. This secondary motion creates a pressure in the upper portion of chamber 171 thereby causing liquid to flow through aperture 175 to chamber 172 to again initiate flow of liquid through the pilot siphon 60, but the upward movement of the piston 179 creates a suction in the lower part of chamber 171 which cannot be satisfied by the flow of liquid through the aperture 174, and therefore creates a suction in the siphon 178 to cause the liquid therein to be drawn inwardly, thereby terminating the flow through siphon 178.

In Figure 7 is shown an alternative structure which may be used for a liquid conduit in place of the siphons which have been shown elsewhere in the drawings. The arrangement consists of two pieces of flat metal 190 and 191 formed in an inverted U-shape and situated one within the other so that the space between the two members is relatively slight, say $\frac{1}{32}''$ when using number one fuel oil. The two pieces are joined at their open ends by soldering as shown at 192 or other means for joining. A rod 193 is fastened to the upper curvature of the external member 191, and any of the means shown hereinbefore may be utilized for positioning the device with relation to the head of the liquid in the constant level chamber or the like. I have found that by lowering such a device in a liquid chamber with one leg thereof extending externally of the chamber, liquid will be made to flow from the internal to the external leg. This is believed to be due to surface tension of the liquid, as the liquid tends to wet the surface between the two inverted U-shaped elements and travels upwardly from the normal liquid surface. Perhaps this action can be broadly explained as resulting from capillary attraction. I have also found that after the device has been adjusted so as to initiate liquid flow, further immersion with relation to the liquid level causes an increase of flow. Since this device does not have to be primed, a device of this nature could be substituted without the necessity of the priming means shown heretofore and would suitably control the flow of liquid merely by movement of the device with relation to the level of the liquid in the constant level chamber.

A device of the nature disclosed in Figures 1 and 2 may be advantageously used in a system such as shown in Figure 10 to control the flow of liquid fuel to a liquid fuel burning furnace so as to provide three alternative rates of liquid flow. In the diagrammatic illustration of Figure 10, the chamber 50 is assumed to be associated with means disclosed heretofore for maintaining a substantially constant level of liquid fuel as indicated by the line X—X. The pilot siphon 60, being equipped with member 84, is assumed to be properly mounted in relation to the chamber 50 as also are the main flow control siphons 61 and 62. It is further assumed that all three of the siphons 60, 61 and 62 have been primed and that pilot siphon 60 is manually positioned to conduct just sufficient fuel to maintain a minimum flame in the burner (not shown). Siphon 61 is equipped with a hinged bimetal actuator 70 having a helically wound heating element 71 in heat transfer relationship with it. Siphon 62 is likewise equipped with a similar actuator 70a which is also in heat transfer relationship with a heating element 71a. A transformer 190 having a primary coil 191 and a secondary coil 192, has a source of line voltage supplied to the primary through leads 193, 194. A space thermostat 195 of the usual bimetallic structure is arranged to be mounted in an apartment whose temperature is to be controlled and is capable of warping in two directions in response to a change of temperature as indicated by the letters C and H. The thermostat 195 has two contact blades 196 and 197, having contacts 198, 199. The member 195 is electrically connected to the secondary coil through conductor 200. The contact 198 is arranged to engage contact 201, which is connected by conductor 203 with one end of the heater 71, and contact 199 is arranged to engage contact 202 which is connected by conductor 204 wit hone end of the heater 71a. A conductor 205 connects with the aid of branch conductor 206, the opposite ends of the heaters 71 and 71a with the opposite end of secondary coil 192.

Assuming the temperature within the apartment is within predetermined satisfactory limits, the device will be in the inoperative position shown, with the thermostat blades away from contact and with the main siphons in their raised inoperative position. Should the temperature in the apartment decrease, the thermostat 195 will warp in the direction of the legend C to call for heat from the furnace. On the first increment of movement contact 198 of blade 196 will engage contact 201 and a circuit will be closed to the heater 71 as follows: from secondary 192, conductor 200, thermostat 195, blade 196, contacts 198, 201, conductor 203, heater 71, and conductor 205 back to the secondary 192. As the temperature of heater 71 rises, the bimetal 70 warps downward lowering the siphon 61 with relation to the liquid fuel level in chamber 50 and liquid fuel will commence to flow through siphon 61 to supply, with the pilot flow from siphon 60, an intermediate quantity of liquid fuel. This arrangement will normally supply sufficient fuel to the burner to restore the temperature to normal, but if the temperature continues to decrease, on the next increment of movement of the thermostat 195 the blade 197 will cause engagement of contacts 199, 202 which sets up a circuit to heater 71a as follows: from secondary 192, conductor 200, thermostat 195, blade 197, contacts 199, 202, conductor 204, heater 71a, conductors 206, 205, back to the secondary 192. With a rise of temperature of resistance heater 71a the bimetal 70a warps downward to move siphon 62 into operative relation with respect to the level of liquid in chamber 50 and all three siphons 60, 61, and 62 will permit the flow of liquid fuel to furnish a maximum flow of fuel to the burner. When the demand for increased heat has been satisfied the thermostat 195 will move in the direction of the legend H and will sequentially disengage contacts 202, 199 to restore siphon 62 to its inoperative position to restore intermediate fuel flow, and later, on further rise of temperature, the disengagement of contacts 201, 198, to restore siphon 61 to its inoperative position thus permitting only the constant minimum flow of fuel through the pilot siphon 60.

The advantages of the devices described hereinbefore are numerous. Primarily, I have provided a means of metering liquid which is positive in its action and yet which may be controlled with extreme accuracy. As a means of controlling the flow of liquid fuel to an oil burning furnace, it will be seen that devices of this nature are free from the faults of prior art because residual matter in the fuel will not be able to settle in such a way as to clog the passage through which the fuel must flow. Secondly, I have provided an unrestricted conduit for the flow of liquid wherein the flow may be controlled by moving the conduit with relation to the head of liquid in a reservoir. Thirdly, I have provided a means for obtaining variant rates of flow of liquid by the simplest form of mechanisms, which are inexpensive to make and which will not readily get out of order. Fourthly, my device contains a novel filtering arrangement whereby the filter element may be removed from the top of the device thereby obviating the spillage of liquid which was unavoidable when the filter element was positioned beneath the device in the manner shown in the prior art. Fifthly, since the device is primarily intended to control the flow of liquid fuel to a furnace, the device contains safety features which are operable to place the furnace in a safe condition under any conceivable combination of circumstances. Lastly, since the device is made up of relatively few and simple parts, it may be made in a very inexpensive manner and still maintain a high degree of control of the flow of liquid fuel and yet the device forms a neat and attractive package.

It will be obvious that many changes may be made in the apparatus herein disclosed without departing from the spirit of my invention, and such changes are intended to be covered by the appended claims.

I claim as my invention:

1. A liquid flow control device, comprising, a chamber for receiving liquid, means for controlling flow of liquid into said chamber to maintain a substantially constant level of liquid therein when said device is connected to a liquid supply, a siphon for lifting liquid out of said chamber at a rate dependent upon the relative vertical positions of the liquid in said chamber and the siphon, overflow means associated with said chamber having control means for stopping the flow of liquid into said chamber and having a siphon adapted to drain said overflow means upon the resetting of said control means into its liquid flow permitting position, and means to thereafter vary the relative vertical positions of said chamber and said first named siphon.

2. A liquid flow control, comprising, a chamber for receiving liquid, a siphon for lifting liquid out of said chamber, said siphon being of such small cross-sectional area and the effective liquid head acting upon the same being of such small amount that discharge from said siphon is prevented by the surface tension of the liquid at the discharge end thereof, and means associated with the discharge end of said siphon to lessen the surface tension of the liquid at the end of the siphon and cause discharge of liquid therefrom; said means comprising a member fastened to said discharge end in a manner to increase the effective area of said discharge end.

3. A liquid flow control device, comprising, a movable liquid receiving chamber, a counterweight associated with said chamber for moving said chamber in one direction, said chamber and said counterweight being spaced from a common pivot thus providing moment arms for each, the chamber when containing a predetermined weight of liquid overbalancing said counterweight and moving in a second direction, means for admitting liquid to said chamber, connections by which movement of said chamber in said second direction operates said liquid admitting means to reduce the flow of liquid into said chamber, and means responsive to the temperature of said liquid to vary the moment arm of said chamber so that the weight of liquid in said chamber that is required to cause movement of said chamber in said second direction is varied.

4. A liquid flow control device, comprising, a movable liquid chamber mounted within said device, flow control means associated with said chamber to normally maintain a substantially constant liquid level in said chamber, a lever operably associated with said chamber and said flow control means and having a pivot spaced from said chamber and flow control means, and means operably connected to said movable chamber and said lever and controlled by the ambient temperature of the liquid within said chamber to vary the distance between said chamber and said pivot to raise or lower the predetermined height of said liquid level by varying the force applied to said flow control means by said lever and movable chamber.

5. A liquid flow control device, comprising, a chamber for receiving liquid, movable means for varying the flow of liquid into said chamber, members connecting between said chamber and said movable means by which said movable means is operated to reduce the flow of liquid to said chamber by the weight of liquid in said chamber, a constantly open means located adjacent said chamber for conveying liquid from said chamber, and means for moving said chamber and said liquid conveying means relative to each other to start and stop the flow of liquid from said chamber, and second means for moving said chamber relative to said movable means to vary the weight of liquid required to reduce the flow thereof.

6. A liquid flow control device, comprising a movably mounted main liquid chamber, liquid inlet control means controlled by the movement of said movable chamber for directing and controlling the flow of liquid to said chamber, means for only discharging liquid from said chamber, an auxiliary chamber having liquid level control means, spring biased latch means associated with said auxiliary chamber liquid level control means and said inlet control means for positively terminating ingress of liquid to said movable chamber when the liquid level in said auxiliary chamber exceeds a predetermined level, said spring biased latch means being adapted when manually actuated to its latched position to release the inlet control means from the liquid ingress terminating control of said latch means, and means associated with said liquid level control means for discharging liquid from said auxiliary chamber when said latch means is manually moved to its latched position.

7. A liquid flow control device, comprising, a movably mounted main liquid chamber, liquid inlet control means positioned above said chamber and controlled by the movement of said movable chamber for directing and controlling the flow of liquid to said chamber and having an operative position and an inoperative position, an auxiliary chamber having liquid level control means having an operative position and an inoperative position, means associated with said auxiliary chamber liquid level control means for positively terminating ingress of liquid to said movable chamber by placing said liquid inlet control means in said inoperative position when the liquid level in said auxiliary chamber exceeds a predetermined level and causes said liquid level control means to move to its inoperative position, and manually operable means for resetting said liquid inlet control means and said liquid control means to their operative positions, said liquid level control having a siphon thereon for discharging liquid from the auxiliary chamber.

8. A liquid flow control device, comprising, a first movable liquid chamber, liquid inlet control means operably connected to said chamber for maintaining a substantially constant liquid level in said chamber, means for conducting liquid out of said chamber, means responsive to a condition other than a flood condition and associated with said device for deflecting the flow of liquid emitted from said first means into a second chamber, and means associated with said second chamber operatively connected to said inlet control means for terminating the ingress of liquid to said first chamber when the liquid level in said second chamber exceeds a predetermined height.

9. A liquid flow controlling device, comprising, a movable chamber for receiving liquid, means for controlling the flow of liquid to said chamber in response to the position of said movable chamber, overflow means for collecting liquid overflowing from said chamber, connections between said overflow means and said liquid flow controlling means to stop the flow of liquid into said chamber, means for conveying liquid from said chamber, and condition responsive means for deflecting liquid conveyed from said chamber into said overflow means when said condition arises.

10. A liquid flow control device, comprising, a chamber for receiving liquid, movable means for varying the flow of liquid into said chamber, connections between said chamber and said movable means by which said movable means is operated to reduce the flow of liquid to said chamber by the weight of liquid in said chamber, overflow means for receiving liquid overflowing from said chamber, means by which said overflow means stops the flow of liquid into said chamber, means for conveying liquid from said chamber away from said device, and condition responsive movable means for deflecting the liquid conveyed from said chamber into said overflow means when said condition exists.

11. A liquid flow control device comprising, a chamber for liquid, means for conducting liquid into said chamber, a siphon adaptable for conveying liquid from said chamber, means for forcing liquid into said siphon to establish a flow of liquid from said chamber, means for maintaining a substantially constant level of liquid in said chamber, overflow means to collect liquid overflowing from said chamber when the flow of liquid into said chamber exceeds the quantity conveyed by said siphon, means controlled by said overflow means to stop the flow of liquid to said chamber, and means to deflect the flow of liquid from said siphon into said overflow means.

12. A liquid flow control device, comprising a liquid level chamber and a normally inactive chamber, means for conducting liquid out of said liquid level chamber, an outlet formed as a portion of said device for conveying liquid from said device, float actuated means associated with said inactive chamber for controlling the flow of liquid to said liquid level chamber, and a siphon in said device with one leg thereof positioned to discharge liquid into said outlet and the other leg positioned to withdraw liquid from said inactive chamber for conducting liquid from said inactive chamber to said outlet, the float of said float actuated means serving to prime said siphon upon being lowered into said inactive chamber.

13. A device for controlling the flow of liquid fuel to a burner comprising, a chamber for receiving liquid fuel, means for controlling the flow of liquid fuel to said chamber, overflow means for collecting liquid fuel overflowing from said chamber as a result of an abnormal condition, connections between said overflow means and said liquid fuel flow controlling means to stop the flow of liquid fuel into said chamber, a siphon for conveying fuel from said overflow means, a siphon for conveying liquid fuel out of said chamber, and a single fuel outlet from said device adapted to receive fuel directly from said siphons and said overflow means.

14. A liquid flow control device comprising, a chamber for liquid, means for conducting liquid into said chamber, a siphon adaptable for conveying liquid from said chamber, means for forcing liquid into said siphon to establish a flow of liquid from said chamber, means for maintaining a substantially constant level of liquid in said chamber, overflow means to collect liquid overflowing from said chamber, means controlled by said overflow means to stop the flow of liquid to said chamber, and condition responsive means to deflect the flow of liquid from said siphon into said overflow means.

15. A liquid flow control device, comprising, a movable liquid receiving chamber, a counter-weight associated with said chamber for moving said chamber in one direction, said chamber and said counter-weight being spaced from a common pivot thus providing moment arms for each, the chamber when containing a predetermined weight of liquid overbalancing said counter-weight and moving in a second direction, means for admitting liquid to said chamber, connections by which movement of said chamber in said second direction operates said liquid admitting means to reduce the flow of liquid into said chamber, means responsive to the temperature of said liquid to vary the moment arm of said chamber so that the weight of liquid in said chamber that is required to cause movement of said chamber in said second direction is varied, and means for discharging liquid from said chamber.

16. A liquid flow control device, comprising, a movable liquid chamber mounted within said device, flow control means associated with said chamber to normally maintain a substantially constant liquid level in said chamber, a lever operably associated with said chamber and said flow control means and having a pivot spaced from said chamber and flow control means, means operably connected to said movable chamber and said lever and controlled by the ambient temperature of the liquid within said chamber to vary the distance between said chamber and said pivot to raise or lower the predetermined height of said liquid level by varying the force supplied to said flow control means by said lever and movable chamber, and means for discharging fluid from said chamber.

17. A liquid flow control device, comprising, a movable liquid chamber mounted within said device, flow control means associated with said chamber to normally maintain a substantially constant liquid level in said chamber, a lever operably associated with said chamber and said flow control means and having a pivot spaced from said chamber and flow control means, means operably connected to said movable chamber and said lever and controlled by the ambient temperature of the liquid within said chamber to vary the distance between said chamber and said pivot to raise or lower the predetermined height of said liquid level by varying the force supplied to said control means by said lever and movable chamber, a siphon mounted adjacent said chamber for conducting liquid out of said chamber, manually operable means for initiating flow of liquid through said siphon, and thermostatic means operably associated with said device for terminating flow of liquid through said siphon.

18. A liquid flow control device, comprising, a movable liquid receiving chamber, a counter-weight associated with said chamber for moving said chamber in one direction, said chamber and said counter-weight being spaced from a common pivot thus providing moment arms for each, the chamber when containing a predetermined weight of liquid overbalancing said counter-weight and moving in a second direction, means for admitting liquid to said chamber, connections by which movement of said chamber in said second direction operates said liquid admitting means to reduce the flow of liquid into said chamber, means responsive to the temperature of said liquid to vary the moment arm of said chamber so that the weight of liquid in said chamber that is required to cause movement of said chamber in said second direction is varied, a siphon for conveying liquid from said chamber, means for selectively forcing liquid into and out of said siphon for establishing and discontinuing flow of liquid from said chamber, manual means for operating said forcing means to establish flow of liquid, and automatic means for operating said forcing means to discontinue said flow.

19. A liquid flow control device, comprising, a movable liquid chamber mounted within said device, flow control means associated with said chamber to normally maintain a substantially constant liquid level in said chamber, a lever operably associated with said chamber and said flow control means and having a pivot spaced from said chamber and flow control means, means operably connected to said movable chamber and said lever and controlled by the ambient temperature of the liquid within said chamber to vary the distance between said chamber and said pivot to raise or lower the predetermined height of said liquid level by varying the force supplied to said flow control means by said lever and said movable chamber, first and second siphons for conveying liquid out of said chamber at different rates, and means selectively operable to force liquid into the first of said siphons and out of the second thereof or to force liquid into the second of said siphon and out of the first thereof, whereby one or the other of said siphons is selectively rendered operative to convey liquid out of said chamber.

20. A liquid flow control device, comprising, a movable liquid receiving chamber, a counter-weight associated with said chamber for moving said chamber in one direction, said chamber and said counter-weight being spaced from a common pivot thus providing moment arms for each, the chamber when containing a predetermined weight of liquid overbalancing said counter-weight and moving in a second direction, means for admitting liquid to said chamber, connections by which movement of said chamber in said second direction operates said liquid admitting means to reduce the flow of liquid into said chamber, means responsive to the temperature of said liquid to vary the moment arm of said chamber so that the weight of liquid in said chamber that is required to cause movement of said chamber in said second direction is varied, first and second siphons for conveying liquid out of said chamber at different rates, and plunger means which when operated in a first direction forces liquid into said first siphon and out of said second siphon and when operated in a second direction forces liquid into said second siphon and out of said first siphon.

21. A liquid flow control device, comprising, a movable liquid chamber mounted within said device, flow control means associated with said chamber to normally maintain a substantially constant liquid level in said chamber, a lever operably associated with said chamber and said flow control means and having a pivot spaced from said chamber and flow control means, means operably connected to said movable chamber and said lever and controlled by the ambient temperature of the liquid within said chamber to vary the distance between said chamber and said pivot to raise or lower the predetermined height of said liquid level by varying the force supplied to said flow control means by said lever and said movable chamber, first and second siphon for conveying liquid out of said chamber at different rates, plunger means which when operated in a first direction forces liquid into said first siphon and out of said second siphon and when operated in a second direction forces liquid into said second siphon and out of said first siphon, and electrical means in control of said plunger means.

22. A liquid flow control device, comprising, a movable liquid chamber mounted within said device, flow control means associated with said chamber to normally maintain a substantially constant liquid level in said chamber, a lever operably associated with said chamber and said flow control means and having a pivot spaced from said chamber and flow control means, means operably connected to said movable chamber and said lever and controlled by the ambient temperature of the liquid within said chamber to vary the distance between said chamber and said pivot to raise or lower the predetermined height of said liquid level by varying the force supplied to said flow control means by said lever and said movable chamber, and means for lifting liquid out of said chamber comprising a pair of parallel closely spaced U shaped plates having one pair of their lower ends located within said chamber and another pair terminated outside of said chamber.

23. A liquid flow control device, comprising, a movable liquid receiving chamber, a counter-weight associated with said chamber for moving said chamber in one direction, said chamber and said counter-weight being spaced from a common pivot thus providing moment arms for each, the pivot thus providing moment arms for each, the chamber when containing a predetermined weight of liquid overbalancing said counter-weight and moving in a second direction, means for admitting liquid to said chamber, connections by which movement of said chamber in said second direction operates said liquid admitting means to reduce the flow of liquid into said chamber, means responsive to the temperature of said liquid to vary the moment arm of said chamber so that the weight of liquid in said chamber that is required to cause movement of said chamber in said second direction is varied, means for lifting liquid out of said chamber comprising a pair of parallel closely spaced U shaped plates having one pair of their ends located within said chamber and the other end of each plate terminated outside of said chamber, and means bridging the ends of each pair of plate ends.

24. A liquid flow control device, comprising, a movable liquid chamber mounted within said device, flow control means associated with said chamber to normally maintain a substantially constant liquid level in said chamber, a lever operably associated with said chamber and said flow control means and having a pivot spaced from said chamber and flow control means, means operably connected to said movable chamber and said lever and controlled by the ambient temperature of the liquid within said chamber to vary the distance between said chamber and said pivot to raise or lower the predetermined height of said liquid level by varying the force supplied to said flow control means by said lever and said movable chamber, first and second siphons for conveying liquid out of said chamber at different rates, and means movable relative to each of said siphons and selectively operable to force liquid into the first of said siphons and out of the second thereof or to force liquid into the second of said siphons and out of the first thereof, whereby one or the other of said siphons is selectively rendered opertaive to convey liquid out of said chamber.

25. A liquid flow control device, comprising, a movable liquid chamber mounted within said device, flow control means associated with said chamber to normally maintain a substantially constant liquid level in said chamber, a lever operably associated with said chamber and said flow control means and having a pivot spaced from said chamber and flow control means, means operably connected to said movable chamber and said lever and controlled by the ambient temperature of the liquid within said chamber to vary the distance between said chamber and said pivot to raise or lower the predetermined height of said liquid level by varying the force supplied to said flow control means by said lever and said movable chamber, first and second siphons for conveying liquid out of said chamber at different rates, and means movable with one of said siphons and selectively operable to force liquid into the first of said siphons and out of the second thereof or to force liquid into the second of the siphons and out of the first thereof, whereby one or the other of said siphons is selectively rendered operative to convey liquid out of said chamber.

26. A liquid flow control device, comprising, a movable liquid chamber mounted within said device, flow control means associated with said chamber to normally maintain a substantially constant liquid level in said chamber, a lever operably associated with said chamber and said flow control means and having a pivot spaced from said chamber and flow control means, means operably connected to said movable chamber and said lever and controlled by the ambient temperature of the liquid within said chamber to vary the distance between said chamber and said pivot to raise or lower the predetermined height of said liquid level by varying the force supplied to said flow control means by said lever and said movable chamber, first and second siphons for conveying liquid out of said chamber at different rates, and plunger means movable with one of said siphons which when operated in a first direction forces liquid into the said first siphon and out of said second siphon and when operated in a second direction forces liquid into said second siphon and out of said first siphon.

27. A liquid flow control device, comprising, a movable liquid chamber mounted within said device, flow control means associated with said chamber to normally maintain a substantially constant liquid level in said chamber, a lever operably associated with said chamber and said flow control means and having a pivot spaced from said chamber and flow control means, means operably connected to said movable chamber and said lever and controlled by the ambient temperature of the liquid within said chamber to vary the distance between said chamber and said pivot to raise or lower the predetermined height of said liquid level by varying the force supplied to said flow control means by said lever and said movable chamber, a group of three interconnecting compartments positioned in said chamber, first and second siphons having legs extending through enlarged openings in a first and a second of said compartments respectively for conveying liquid out of said chamber at different rates, and plunger means within the third of said compartments which when operated in a first direction forces liquid into said first siphon and out of said second siphon and when operated in a second direction forces liquid into said second siphon and out of said first siphon.

28. A liquid flow control device, comprising, a movable liquid receiving chamber, a counterweight associated with said chamber for moving said chamber in one direction, said chamber and said counter-weight being spaced from a common pivot thus providing moment arms for each, the chamber when containing a predetermined weight of liquid overbalancing said counter-weight and moving in a second direction, means for admitting liquid to said chamber, connections by which movement of said chamber in said second direction operates said liquid admitting means to reduce the flow of liquid into said chamber, means responsive to the temperature of said liquid to vary the moment arm of said chamber so that the weight of liquid in said chamber that is required to cause movement of said chamber in said second direction is varied, a group of three intercommunicating compartments positioned in said chamber, first and second siphons having legs extending through enlarged openings in a first and a second of said compartments respectively for conveying liquid out of said chamber at different rates, and plunger means within the third of said compartments which when operated in a first direction forces liquid into said first siphon and out of said second siphon and when operated in a second direction forces liquid into said second siphon and out of said first siphon, said plunger having a vent therein extending from the piston end thereof to a point above said chamber.

29. A liquid flow control device, comprising, a movable liquid receiving chamber, a counterweight associated with said chamber for moving said chamber in one direction, said chamber and said counter-weight being spaced from a common pivot thus providing moment arms for each, the chamber when containing a predetermined weight of liquid overbalancing said counter-weight and moving in a second direction, means for admitting liquid to said chamber, connections by which movement of said chamber in said second direction operates said liquid admitting means to reduce the flow of liquid into said chamber, means responsive to the temperature of said liquid to vary the moment arm of said chamber so that the weight of liquid in said chamber that is required to cause movement of said chamber in said second direction is varied, two intercommunicating compartments suspended within but spaced from the walls of said chamber, a first siphon having one of its legs outside of said chamber and the other leg extending through an aperture in one of said compartments, and a second siphon having one of its legs outside of said chamber and the other leg extending through an aperture in the second of said compartments, said second siphon having a piston on said other leg adapted to selectively force liquid through one or the other of said siphons and said second compartment having an opening in the wall thereof below said piston.

JOSEPH O. THORSHEIM.

REFERENCES CITED

The following references are of record in the file of this patent:

UNITED STATES PATENTS

| Number | Name | Date |
| --- | --- | --- |
| 146,335 | Harris | Jan. 13, 1874 |
| 755,941 | Roberts | Nov. 29, 1904 |
| 1,077,471 | Herzfeld | Nov. 4, 1913 |
| 1,163,494 | Wickham | Dec. 7, 1915 |
| 1,627,451 | Palmer | May 3, 1927 |
| 1,634,518 | Rottger | July 5, 1927 |
| 1,683,737 | Stancliffe | Sept. 11, 1928 |
| 1,729,484 | Lee | Sept. 24, 1929 |
| 1,820,774 | Boyce | Aug. 25, 1931 |
| 1,856,083 | Sather | May 3, 1932 |
| 1,970,880 | Bird | Aug. 21, 1934 |
| 2,056,477 | McIlvaine | Oct. 6, 1936 |
| 2,082,149 | Cheavens | June 1, 1937 |
| 2,118,349 | Hoogendam | May 24, 1938 |
| 2,129,937 | Johnson | Sept. 13, 1938 |
| 2,130,930 | Rose | Sept. 20, 1938 |
| 2,139,616 | Foulds | Dec. 6, 1938 |
| 2,146,260 | Kirgan | Feb. 7, 1939 |
| 2,194,133 | Whitcomb | Mar. 19, 1940 |
| 2,220,294 | Sibley | Nov. 5, 1940 |
| 2,241,327 | Selby | May 6, 1941 |
| 2,269,848 | French | Jan. 13, 1942 |
| 2,303,235 | Seldon | Nov. 24, 1942 |
| 2,317,556 | Russel | Apr. 27, 1943 |
| 2,329,820 | Breese | Sept. 21, 1943 |
| 2,335,212 | Landon | Nov. 23, 1943 |
| 2,338,319 | De Lancey | Jan. 4, 1944 |
| 2,344,590 | Breese | Mar. 21, 1944 |
| 2,346,817 | Breese et al. | Apr. 18, 1944 |
| 2,416,514 | Chadwick | Feb. 25, 1947 |